United States Patent [19]
Kim et al.

[11] Patent Number: 5,777,681
[45] Date of Patent: Jul. 7, 1998

[54] METHOD OF EXTRACTING COLOR DIFFERENCE SIGNAL MOTION VECTOR AND A MOTION COMPENSATION IN HIGH DEFINITION TELEVISION

[75] Inventors: Beom Soo Kim, Seoul; Jin Hak Lee, Kyungki-do; Kyoung Bong Koo, Seoul, all of Rep. of Korea

[73] Assignee: Hyundai Electronics Industries, Co., Ltd., Kyungki-Do, Rep. of Korea

[21] Appl. No.: 562,752

[22] Filed: Nov. 27, 1995

Related U.S. Application Data

[63] Continuation of Ser. No. 175,724, Dec. 30, 1993, abandoned.

[30] Foreign Application Priority Data

Dec. 31, 1992 [KR] Rep. of Korea ............... 1992-27242

[51] Int. Cl.$^6$ ........................................... H04N 7/18
[52] U.S. Cl. ..................... 348/416; 348/415; 348/411; 348/699; 348/394
[58] Field of Search ........................ 348/699, 700, 348/416, 411, 409, 402, 394, 415, 463, 442, 405, 413

[56] References Cited

U.S. PATENT DOCUMENTS

| | | | |
|---|---|---|---|
| 4,752,857 | 6/1988 | Cassagne et al. | 348/396 |
| 4,862,259 | 8/1989 | Gillard et al. | 348/699 |
| 4,862,260 | 8/1989 | Harradine et al. | 348/699 |
| 4,924,298 | 5/1990 | Kitamura | 348/394 |
| 5,045,939 | 9/1991 | Okayama et al. | 348/699 |
| 5,130,786 | 7/1992 | Murata | 348/691 |
| 5,157,742 | 10/1992 | Wiihara | 348/699 |
| 5,159,443 | 10/1992 | Ando | 348/453 |
| 5,353,118 | 10/1994 | Cho | 348/450 |
| 5,376,968 | 12/1994 | Wu et al. | 348/413 |
| 5,412,428 | 5/1995 | Tahara | 348/699 |
| 5,456,523 | 10/1995 | Tanaka | 348/488 |
| 5,523,786 | 6/1996 | Parulski | 348/296 |
| 5,544,263 | 8/1996 | Iwamura | 348/402 |

Primary Examiner—Tommy P. Chin
Assistant Examiner—Anand S. Rao
Attorney, Agent, or Firm—Watson Cole Stevens Davis, PLLC

[57] ABSTRACT

A method of extracting a color difference signal, a motion vector and motion compensator in HDTV, wherein motion vectors are multiplexed to one serial motion vector in a 4 step parallel process when compressing data, and in a motion compensation device for a memory address controller of HDTV, the first and second multiplexers are connected to data bus for horizontal address between a Raster format write and a memory of the address controller, and the third multiplexer is connected to a data bus for vertical address, and above the first to the third multiplexers selects addresses of color difference vertical/horizontal motion vector generator and luminance vertical/horizontal motion vector generator, and a motion compensator is structured to control motion compensation of the memory, and the output pixel from the memory is selected in the motion compensator by the motion pixel selector; motion vector, which is processed in 4 step parallel, is multiplexed to one serial motion vector, and the circuit is simply structured by using a motion compensation controller, exchanging serial the luminance motion vector into a color difference signal motion vector, and it is easy to compensate motion difference in HDTV since a motion vector of color difference is used for selecting the motion pixel and compensation motion difference.

9 Claims, 10 Drawing Sheets

|          | BLOCK 1 (EVEN) | (ODD) | BLOCK 2 (EVEN) | (ODD) |
|----------|----------------|-------|----------------|-------|
| SLICE 1  | a, e, ., .     | A, E, ., . | v, ., ., .   | V, ., ., . |
| SLICE 2  | b, f, ., .     | B, F, ., . | w, ., ., .   | W, ., ., . |
| SLICE 3  | c, g, ., .     | C, G, ., . | x, ., ., .   | X, ., ., . |
| SLICE 4  | d, h, ., .     | D, H, ., . | y, ., ., .   | Y, ., ., . |

FIGURE 4

METHOD OF EXTRACTING COLOR DIFFERENCE SIGNAL MOTION VECTOR AND A MOTION COMPENSATION IN HIGH DEFINITION TELEVISION

This application is a File Wrapper Continuation of application Ser. No. 08/175,724, filed 30 Dec. 1993, now abandoned.

BACKGROUND OF THE INVENTION

1. Field of the Invention

This invention refers to a method of extracting color difference signals from a motion vector and a motion compensator in high definition television (herein after HDTV), which move as much as a motion vector, and read the previous frame data from a memory unit composed of an odd/even structure, and select and use needed data after reading whole data, and compensate the motion difference as a result. The present invention is applied to HDTV, AT (Advanced Television), MEG (Moving Picture Experts Group), Video Phone and etc., which compress data by using a method of Motion Compensation Interframe.

Generally, AT enables a picture plane to be highly dense and large by extending the aspect ratio and increasing the scanning line number over twice more than the existing television. It is induced and standardized by CCIR (Committee Consutatif International Radio Communication) that the scanning line number is 1125, active scanning line 1035, field frequency Hex, interlaced scanning 2:1; aspect ratio 16:9; pixel number, luminance signals 1920, chrominance signals 960.

One example of AT as suggested above is shown in U.S. Pat. No. 5,043,808 issued by AT & T Bell Laboratories. This patent describes an HDTV receiving system comprising: first and second means which receive prediction error signals during a line scans interval, and motion vectors during a return interval; a third means which combines the prediction error signals generated by the first and second means; a fourth means which generates a video frame according to the output of the third means. This art develops motion vectors and transmits motion estimation error signals during active scan intervals of a standard NTSC signal after encoding them, with decoding in the TV set. And also it is designed, considering the mutual exchange with a NTSC television system. Therefore, the detail of technology on extracting the motion vector of the chrominance signal for motion compensation is not shown in the past as the existing art is for mutual exchange with the NTSC television system. But it is difficult to manufacture this kind of compensation circuit since the control signal is controlled by just the horizontal and vertical signals.

SUMMARY OF THE INVENTION

To solve this problem, this invention multiplexes motion vectors for a 4 path parallel process to one serial motion vector, and then uses the above serial motion vector multiplexed in controlling motion compensation of an address controller. That is, the first and the second multiplexers are connected to a data bus for parallel address between a writer and memory for the Raster Format of a memory address controller in HDTV, and the third multiplexer is connected to a data bus for vertical address, and the above first to third multiplexers select the address of the luminance vertical/horizontal motion vector generator and chrominance vertical/horizontal motion vector generator, controlling the motion compensation of the memory, and the output pixel from the memory is selected to the motion compensation by the motion pixel selector.

The above motion selector comprises a pair of Exclusive OR circuits of which the inputs are respectively provided to a luminance/chrominance horizontal motion vector and clock signals set by the control signal of the motion compensator; a first multiplexer the inputs of which are output from the Exclusive OR circuits; a second multiplexer receives the luminance/chrominance horizontal motion vector; luminance/color difference selection signals from a Raster Format converter, which provides a motion vector to the motion compensator by controlling the above first and second multiplexers.

The motion compensator comprises an exchanger which exchanges even/odd pixel data from the memory, when necessary, according to the output of one multiplexer selected by the motion pixel selection circuit; a shifter which selects and outputs pixel data through the exchanger according to the output of another multiplexer by virtue of the motion pixel selection circuit.

BRIEF DESCRIPTION OF THE DRAWINGS

FIG. 4 shows the first and the second memory block diagram from slice 1 through 4 in the frame of the invention;

DETAILED DESCRIPTION OF THE INVENTION

Figure 12:
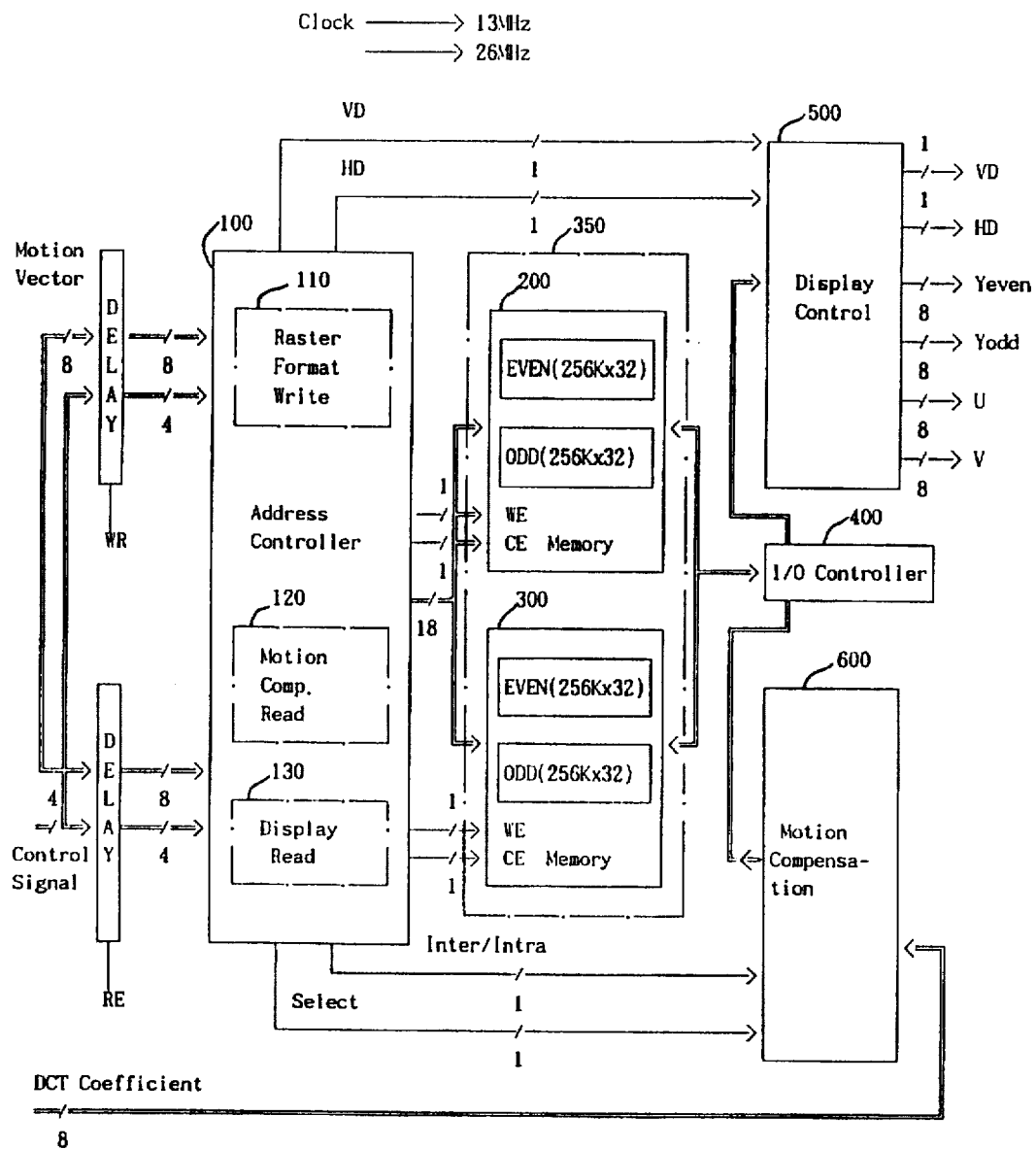
FIG. 12 shows a motion compensation circuit diagram in accordance with the invention.

FIG. 12 is a motion compensation circuit diagram of the invention used in HDTV, and it comprises: an address controller (100) memory (350) to input and output data by using motion vector (MAX, MAY) and a control signal; a previous memory unit (200) storing the image signal of a previous memory frame; memory (350), being composed of a present memory (300) which stores signals of a present frame memory, in which the previous and present memory functions are alternately processed; an I/O controller (400) which controls memory data input and output of memory (350); a display controller (500) which controls the address to the display after being controlled by the I/O controller (400) and extracting memory data of memory (350); a motion compensator (600) in which previous data is extracted, and added to the difference image signals (DC factor), and is changed into image signals of the present frame. And address controller (100) is composed of Raster format writer (110), motion compensation reader (120), and display reader (130).

Figure 5:
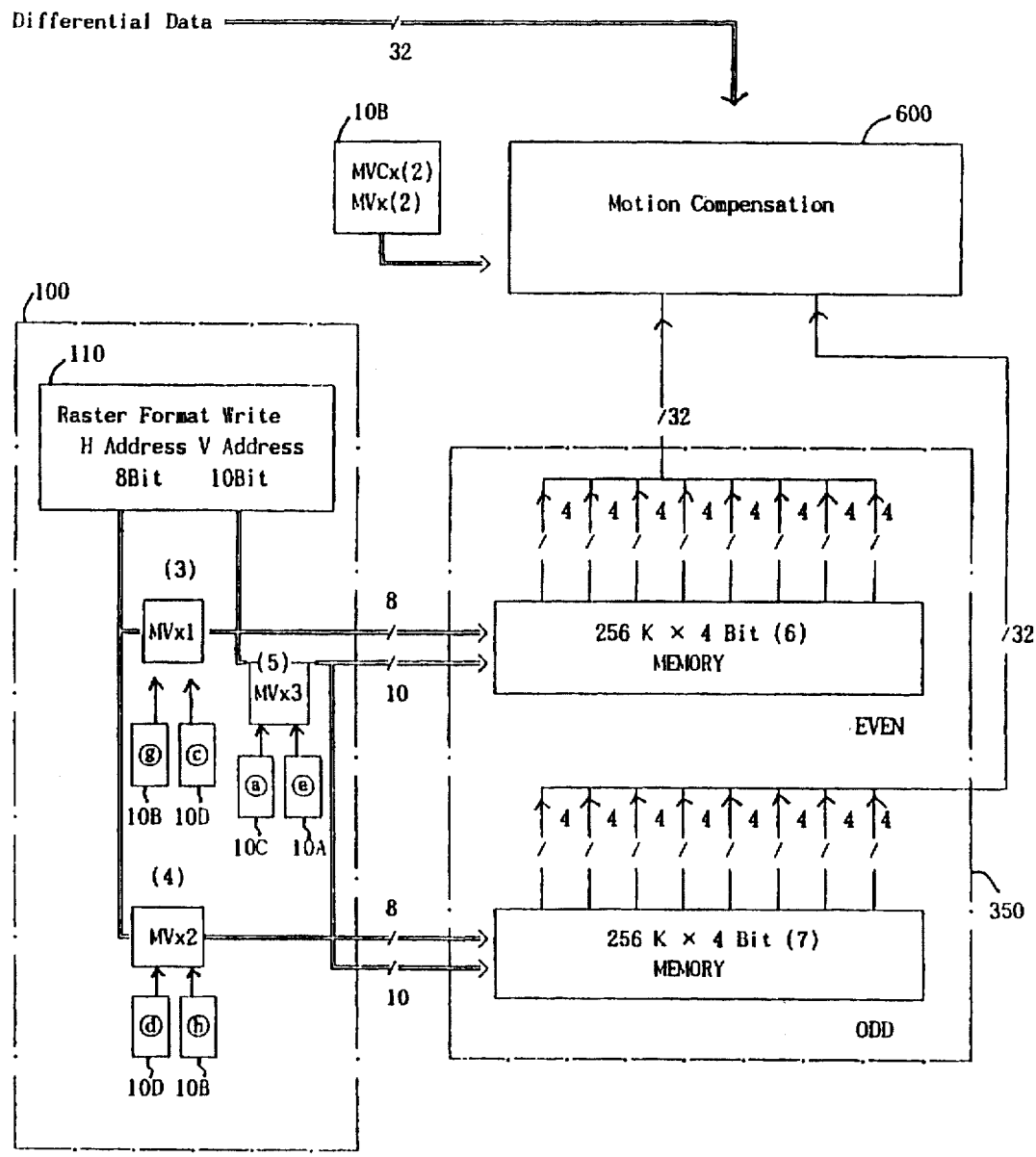
FIG. 5 shows the structure of the motion compensator.
Figure 6:
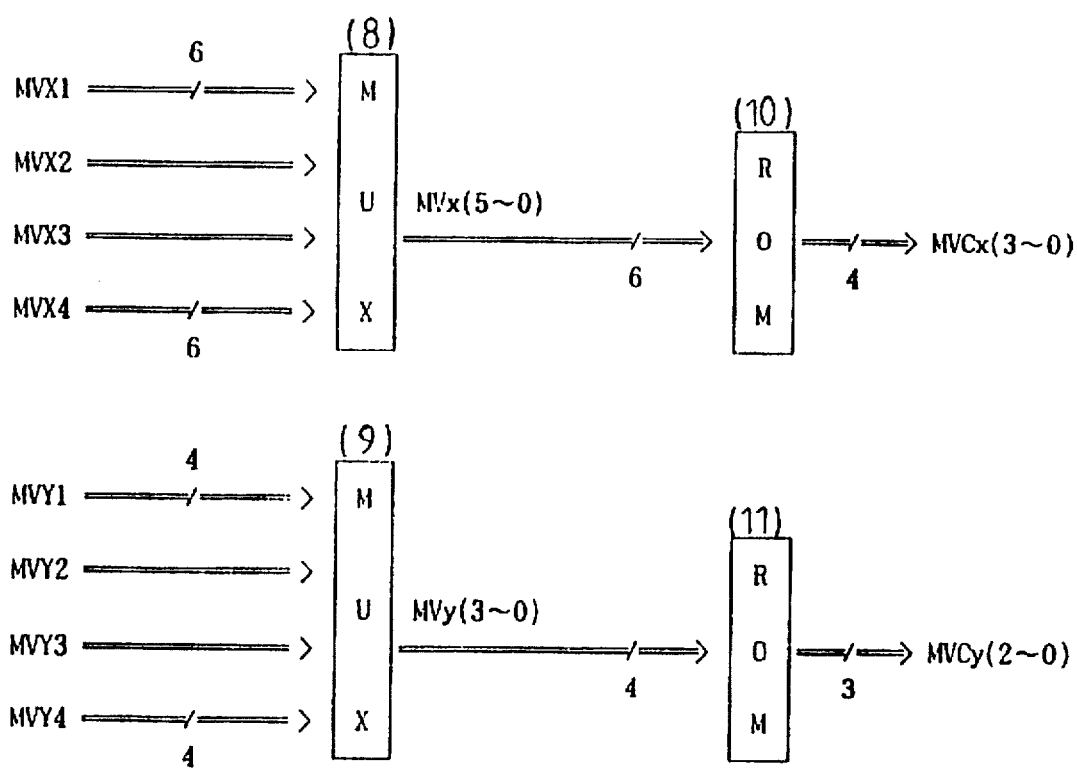
FIG. 6 shows a structural diagram in which the luminance signal motion vector is changed into a chrominance signal motion vector by multiplexing 4 slice motion vectors into one vector in accordance with the invention.
Figure 7:
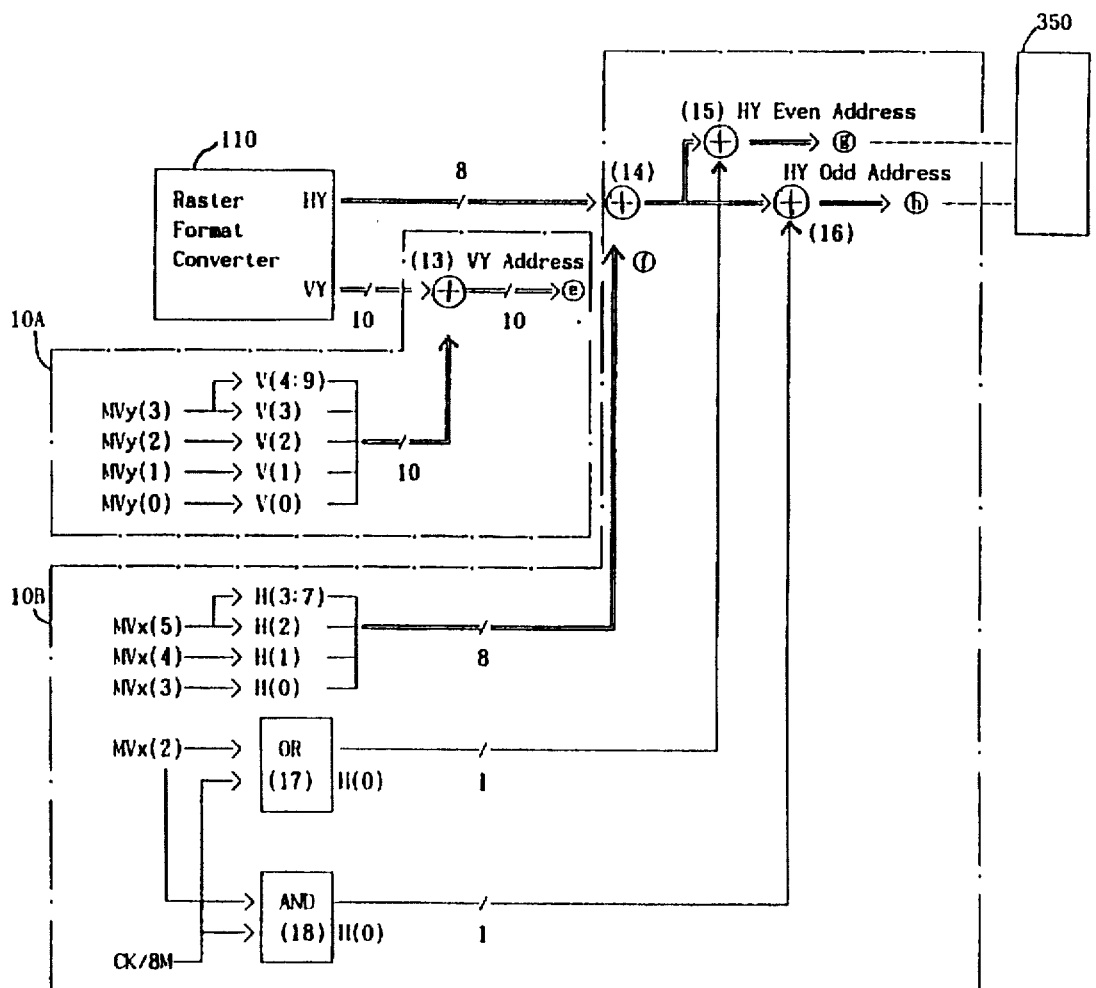
FIG. 7 shows a structural diagram in which the motion vector is generated for motion compensation of a luminance signal in accordance with the invention.
Figure 8:
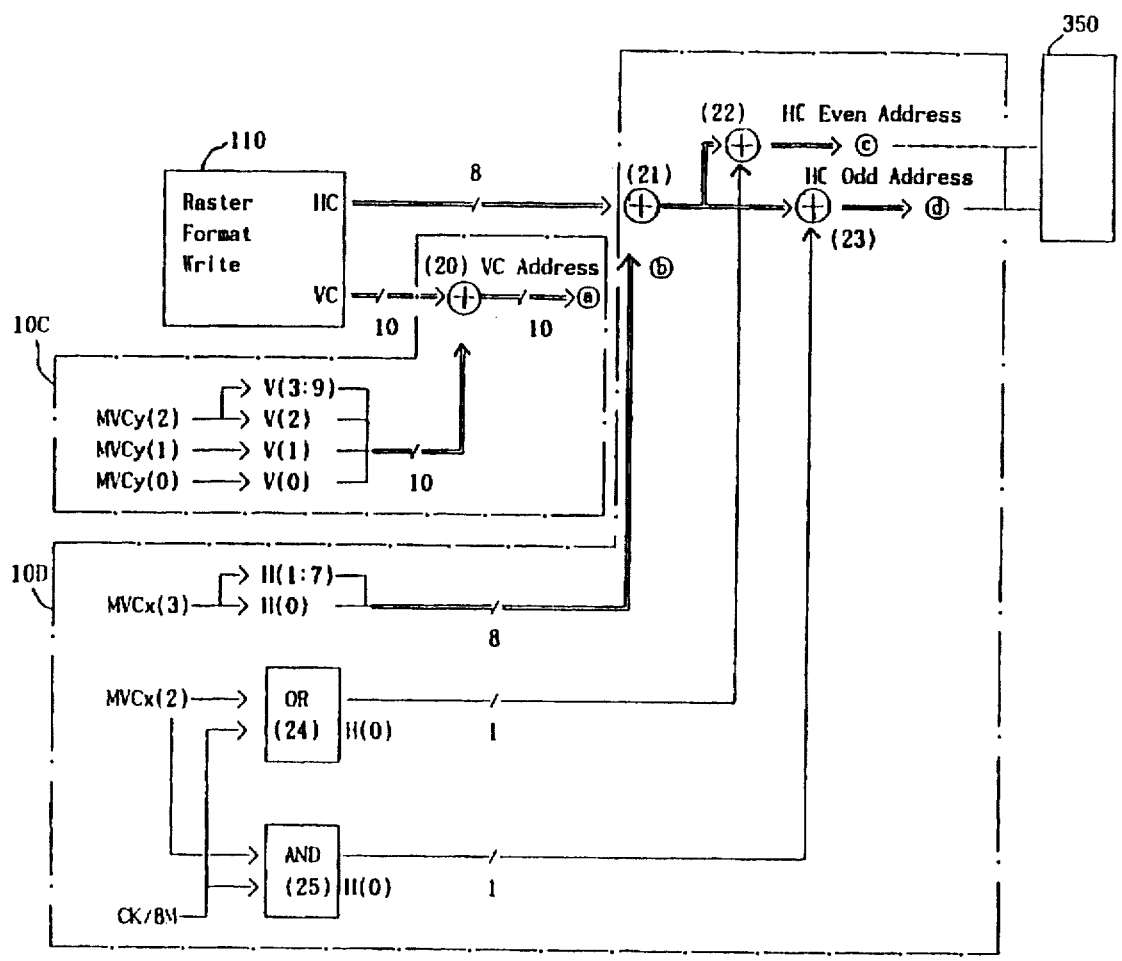
FIG. 8 shows a structural diagram in which the motion vector is generated for motion compensation of a chrominance signal in accordance with the invention.

FIG. 5 is a motion compensation reader, and FIG. 6 is a circuit embodying chrominance signal motion vectors (MVCx, MVCy) by multiplexing 4 slice motion vectors to one vector, and FIG. 7 shows a structural diagram of vertical/horizontal motion vector generators (a, b) for luminance in FIG. 5, and FIG. 8 is a structural diagram of vertical/horizontal motion vector generators (C, d) for obtaining the chrominance. In a memory address controller of the HDTV, the first and second multiplexers (3, 5) are connected to a horizontal address data bus between Raster Format writer (110) of the address controller (100) and memory (350), the third multiplexer (4) is connected to a vertical address data bus, and also the above first to third multiplexers (3–5) are structured (FIG. 5) to select addresses of the luminance vertical/horizontal motion vector generators (a, b) and of the chrominance vertical/horizontal motion vector generators (C, d) so as to control motion compensation of the memory (350), which illustrates an embodiment of the motion compensator (120).

Motion compensator (600) is set to compensate the motion of data in the memory (350) by a motion pixel selector (b) and differential data. The above luminance motion vector generator (a) is designed to input the luminance vertical motion vector (MAY(0)–MVY(3)) to a vertical address bus connected to the Raster Format writer (110) through an adder (3) and provide it to the third multiplexer (5), and the chrominance vertical motion vector generator (b) is designed to input the luminance horizontal motion vector (MAX(3)–MVX(5)) to a horizontal address bus connected to Raster Format writer (110) through an adder (14) and provide it to the first and second multiplexers (3, 5). The above luminance horizontal motion vector generator (b) is designed to control the even/odd memory address by using the luminance horizontal motion vector (MAX(2)) and clock (FIG. 7).

The above chrominance vertical motion vector generator (C) is designed to input the color difference vertical motion vector (MVCy(0)–MVCy(2)) to a vertical address bus connected to the Raster Format writer (110) through an adder (20) and provide it to the third multiplexer (4). The chrominance horizontal motion vector generator (d) is designed to input the chrominance horizontal motion vector (MVCx(3)) to the horizontal address bus connected to the Raster Format writer (110) through the adder (21) and provide it to the first and second multiplexers (3, 5). The above chrominance horizontal motion vector generator (d) is designed to control the even/odd memory address by using the chrominance horizontal motion vector (MVCx(2)) and clock (FIG. 8).

The above luminance vertical motion vectors (MAY(0) –MVY(3)) are provided to the adder (13) through 10 data lines after making another 6 addresses of which the values are the same as one vector (MAY(3)). The above luminance vertical motion vector (MAX(3)–MVX(5)) are provided to the adder (14) through 8 data lines after making another 5 addresses of which the values are the same as one vector (MAX(5)).

The above chrominance vertical motion vectors (MVCy (2)–MVCy(0)) are provided to an adder (20) through 10 data lines after making another 7 addresses of which the values are the same as one vector (MVCy(2)). The above chrominance horizontal motion vector (MVCx(3)) is provided to an adder (21) through 8 data lines after making another 7 addresses of which the values are the same as each other.

Figure 9:
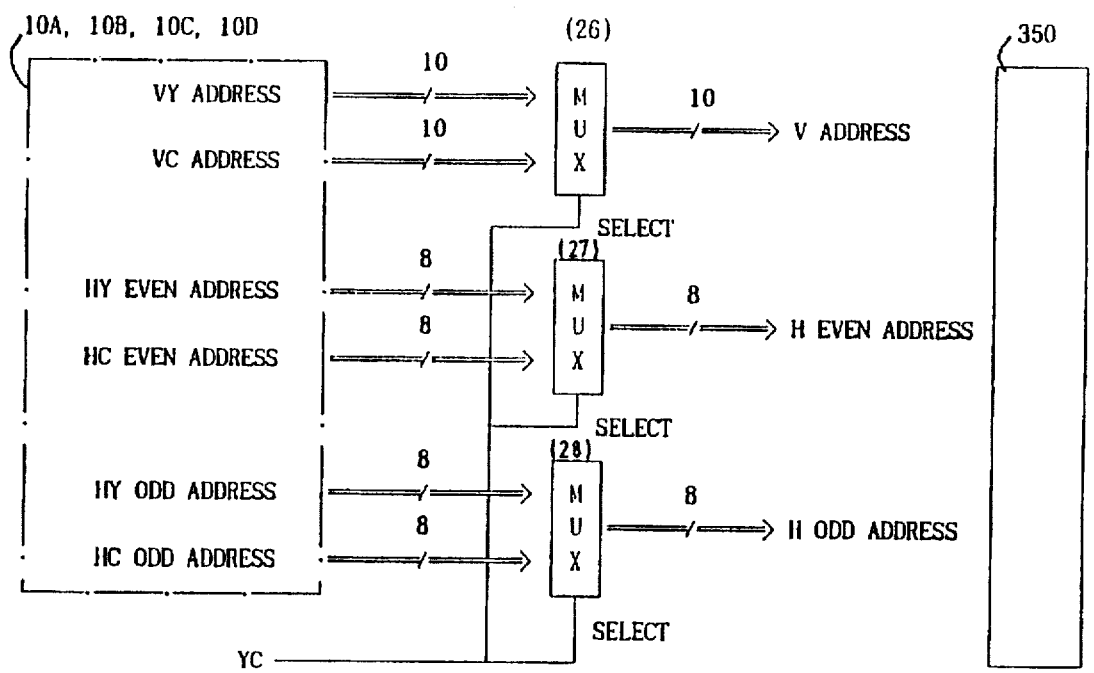
FIG. 9 shows a structural diagram in which motion compensated luminance/chrominance signal addresses are multiplexed in accordance with the invention.

FIG. 9 is a circuit for multiplexing the compensated addresses of the luminance signal and chrominance signal, and when selecting the address of the luminance vertical/horizontal motion vector generators (C, d) and compensating motion of the memory (350), the address bus, which is an output of the luminance vertical/horizontal motion vector generators (a, b) and the chrominance vertical/horizontal motion vector generators (C, d) is given to the multiplexers (26, 27 and 28) which are designed to select an address bus by control signals (Y) for the luminance/chrominance selection which are outputs of the Raster Format writer (110).

Figure 10:
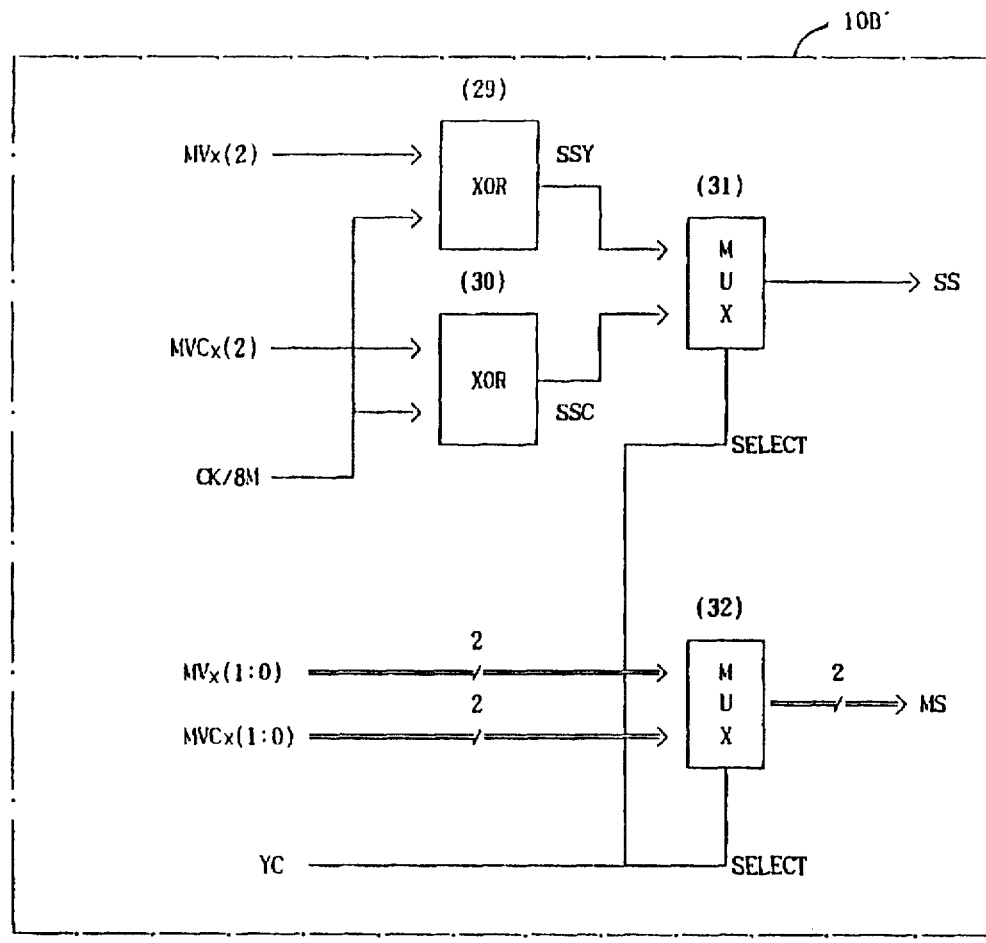
FIG. 10 shows a pixel selector structure in accordance with the invention.

FIG. 10 is a structural diagram of motion pixel selector (10'), comprising a pair of Exclusive OR circuits (29, 30) to which are input a control signal for motion compensation, that is, luminance/chrominance horizontal motion vector (MAX(2), (MVCX(2) and a clock; a multiplexer (3) of which the input is the output of Exclusive OR circuits (29, 20); a multiplexer (32) of which the inputs are luminance/chrominance horizontal motion vectors (MAX(0–1), )MVCX(0–1); a Raster Format writer (110), which provides a motion vector to a motion compensator (600) by controlling the above multiplexers (31, 32) of which the output is a control signal (Y) for luminance/chrominance selection.

Figure 11:
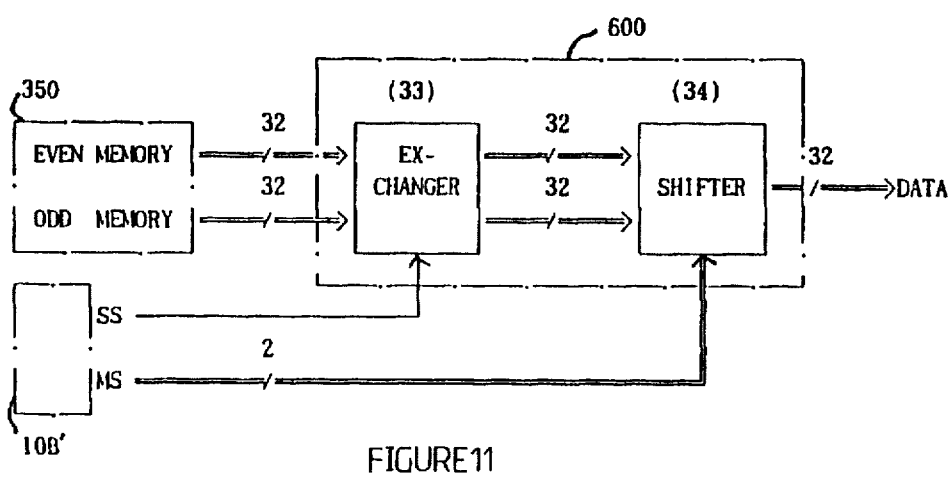
FIG. 11 shows a motion compensator structure in accordance with the invention.

FIG. 11 shows a structure of the motion compensator (600), comprising: an exchanger (33) which exchanges even/odd pixel data of memory (350), when necessary, according to output (SS) of the multiplexer (31) by a motion pixel selector (b); a shifter (34) for selecting pixel data through the exchanger (33) according to output (MS) of the multiplexed (32) by a motion pixel selection circuit (b).

With respect to the function of the invention, the data used in this invention is for decoding the data compressed in a form of motion compensation frame intervals using DPCM coding in a digital system of HDTV, and the data have a hierarchical structure, that is, from the least, Block, Macro block, Slice, Frame, for the benefit of DC (Discrete Cosine Transform) and motion compensation.

Figure 1:
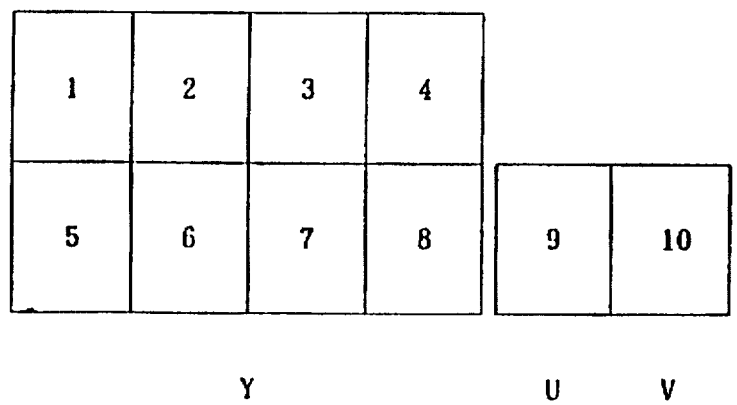
FIG. 1 shows a macro block diagram of the invention.
Figure 2:
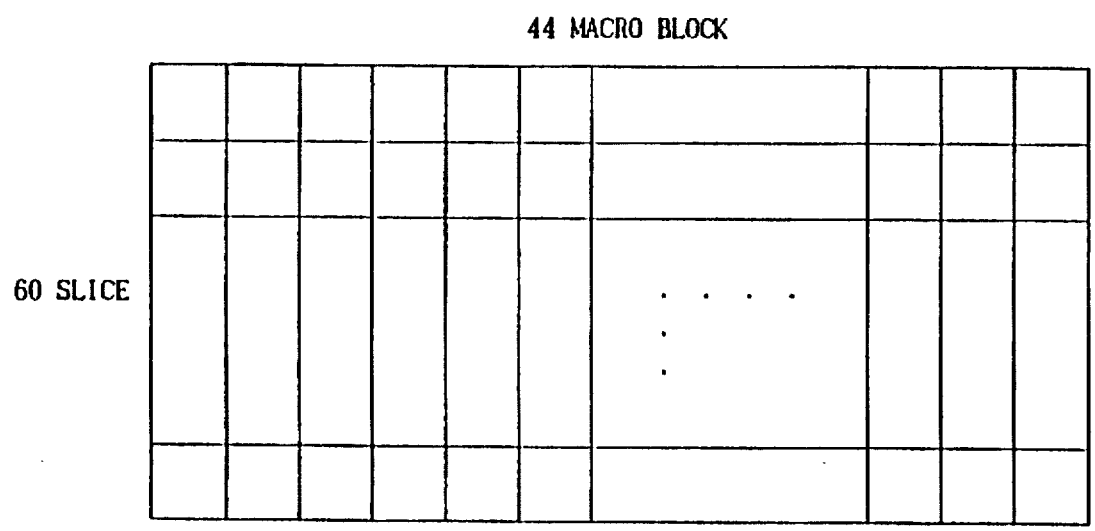
FIG. 2 shows another block diagram of the invention.

The size of one block is 8 by 8, 8 pixels in horizontal and 8 lines in vertical, and one macro block is a luminance signal of 8 blocks and a chrominance signal of 2 blocks (UV, 1 block, each). FIG. 1 shows a macro block. The size of one slice is 44 macro blocks, and FIG. 2 shows a structure of slices in frame and macro blocks. The Y (luminance signal), U (chrominance signal), V (chrominance signal) have 60 slices respectively, one of which has 44 macro blocks.

Figure 3:
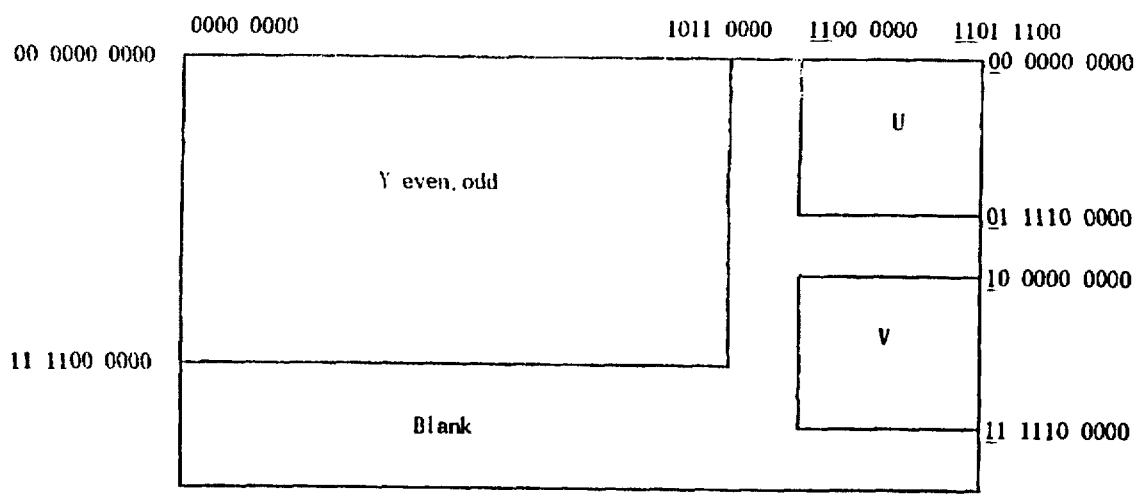
FIG. 3 shows a Y, U, V location diagram of a frame memory in accordance with the invention.

FIG. 3 shows a location of Y, U, V in a frame memory. In the case of HDTV, a parallel process is required as the processing speed is fast. In this regard, the present invention is designed in a form of 4 path parallel process, and the memory is divided into an even memory and an odd memory for considering motion compensation. FIG. 4 shows the first block from slice 1 through slice 4. The first 4 pixels of slice 1 through slice 4, that is, of slice 1, b of slice 2, c of slice 3, d of slice 4 are stored in the even memory. The second 4 pixels, A of slice 1, B of slice 2, C of slice 3, D of slice 4 are stored in the odd memory. The order stored in memory is a, b, c, d, A, B, C, D, e, f, g, h, E, F, G, H and a, b, c, d, e, f, g, h are stored in the even memory, and A, B, C, D, E, F, G, H in the odd memory.

When 44 macro blocks are stored, r slices are stored as it is processed in parallel by 4 path, and then slice 5 through slice 10 are stored the same way.

The Raster Format writers (110) in FIG. 5, FIG. 7 and FIG. 8 are address generators for the purpose of reading, by block unit, the stored data from the frame memory.

The procedure for motion compensation is as follows. As shown in FIG. 4, since the horizontal/vertical signals, which are the output of the Raster Format writer (110), are processed in parallel, the multiplexers (9, 8) are set to select 4 slice luminance signal vertical/horizontal motion vectors (MVy1–MVy4, MVx1–MVx4) by the clock unit, and to the same as the timing of the output of the Raster Format writer (110). And a ROM (Read Only Memory) (10, 11) in FIG. 6 change the luminance signal vertical motion vector 4 bits (MVy3–MVy0) and the horizontal motion vector 6 bits (MVx5–MVx0) into a chrominance signal vertical motion vector of 3 bits (MVCy2–MVCy0) and a horizontal motion vector of 4 bits (MVCx3–MVCx0).

And then the luminance signal vertical motion vector (MVy3–MVy0) on the 4 slices of which the format was changed into a clock unit by a multiplexer (9) in FIG. 6, is added to the Raster Format writer (110) by an adder (13) in FIG. 7 to enable the vertical address to move. The above vertical motion vector is made to be 10 bits by extending the most significant bit before adding a vertical address since the vertical motion vector is a two's complement as shown at the luminance vertical motion vector generator (a) in FIG. 7. That is, the most significant bit (MVy3) of the vertical motion vector is added to the vertical address (VY3-Y).

And also the most significant 3 bits among the luminance signal horizontal motion vectors (MVx1–MVx4) for 4 slices of which the format was changed into a clock unit by the multiplexer (8) in FIG. 6 move a horizontal address by adding a horizontal address (H) of the Raster Format convertor (110) by an adder (14) in FIG. 7. And also at this time, the horizontal motion vector is made to be 8 bits by extending the most significant bit before adding a horizontal address since the horizontal motion vector is a two's complement as shown at the motion vector generator (b) in FIG. 7. That is, the most significant bit (MVx5) of the horizontal motion vector is added to the horizontal address HY(2)–HY(7).

A feature of this invention is that the memory (350) is instructed to have an even/odd function, and the first pixel of the block in FIG. 4 reads the data of the even memory and simultaneously the next 4 pixels read the data of the odd memory to select the mended 4 pixels according to the motion vector among the 8 pixels. A method to read 8 pixels from the even/odd memory can be shown by the following two cases. In the first case, "a" may be read out of the even memory and "A" read out of the odd memory. In the second case, "A" may be read out of the odd memory and "a" read out of the even memory. Hence, to generate respective horizontal addresses of the even/odd memory, the MAX(2) bit is used as shown in FIG. 5 and FIG. 10.

For example, in the case where MAX(2)=0, the addressing order for motion compensation in each memory is as follows:

Even memory: (0,0)(0,1)(1,0)(1,1)(2,0)(2,1) . . . (7, 0)(7, 1)

Odd memory: (0,0)(0,0)(1,0)(1,0)(2,0)(2,0) . . . (7,0)(7, 0)

Wherein, a horizontal address in the even memory is changed to be 0, 1 and a horizontal address in the odd memory is set to be 0.

However, in the case where MAX(2)=1, an addressing order needed to compensate motion in each memory is as follows:

Even memory: (0,1)(0,1)(1,1)(1,1)(2,1)(2,1) . . . (7,1)(7, 1)

Odd memory: (0,0)(0,1)(1,0)(1,1)(2,0)(2,1) . . . (7,0)(7,1)

Wherein, a horizontal address in the even memory is set to be 1, and a horizontal address in the odd memory is changed to be 0,1 every clock pulse. And this time, an address for a slice has to be generated every clock pulse, it is required that the clock is C/M.

To implement this function, after making a horizontal address of the luminance signal for the even memory by adding an output of OR gate (17) of which the inputs are MAX(2), C/8 MHZ> to a sum of horizontal address (H) and the most significant 3 bits of the horizontal motion vector in the adder (15) of FIG. 7, making a horizontal address (H odd address) of the luminance signal for the odd memory by adding an output of AND gate (18) of which the inputs are MAX(2), C/8 MHZ> to a sum of the horizontal address (H) and the most significant 3 bits of the horizontal motion vector in the adder (16) of FIG. 7, those addresses are input to the memory (350).

The vertical addresses are moved by adding the color difference vertical motion vectors (MVCy(2-0), which are obtained from ROM(11) in FIG. 6, to vertical address (VC) of the Raster Format writer (110) by an adder (20) in FIG. 8. The vertical motion vector is designed to be 10 bits by extending the most significant bit before adding it to a vertical address since it is a two's complement. That is, the most significant bit (MVCy2) of the chrominance signals vertical motion vector is added to vertical address VC(2) –VC(9).

Similarly, the horizontal address is moved by adding the most significant bit among the chrominance signal horizontal motion vectors (MVCx3-0), which are obtained from ROM (10) in FIG. 6, to the horizontal address (H) of the Raster Format writer (110) by an adder (21) in FIG. 8. The horizontal motion vector is designed to be 8 bits by extending the most significant bit before adding it to a horizontal address since one is a two's complement. That is, the most significant bit (MVx3) of the chrominance signal horizontal motion vector is added to horizontal address H(0)–HY(7).

And also in the case of where the chrominance signal, the horizontal addresses of the even/odd memories have to be respectively generated like the luminance signal, and this purpose may be achieved as follows. The horizontal address (H even address) of the chrominance signal for the even memory is generated by adding <MVCx(2) or C/8> of an adder (22) in FIG. 8 to the sum of a horizontal address (H) and the most significant 1 bit of the horizontal motion vector. The horizontal address (H even address) of the chrominance signal for the even memory is generated by adding <MVCx (2) and C/8> of an adder (23) in FIG. 8 to the sum of a horizontal address (H) and the most significant 1 bit of the horizontal motion vector.

As explained above, the new address luminance and chrominance signals are generated by the compensating motion vector, and a luminance signal address is outputted during the luminance signal intervals, while a chrominance signal address is outputted during the chrominance signal intervals. To achieve this the signal (Y) of FIG. 9 is set to become high during luminance signal (Y) intervals of block 1 through block 8 of FIG. 1 and low during chrominance signal (U, V) of block 9 through block 10, and address V, even address H and odd address H are outputted in the luminance signal intervals while the above addresses are outputted in the chrominance intervals by using the Y signal as a selection control signal of the multiplexed (26, 27 and 28) in FIG. 9.

Previously it has been explained that the memory address is controlled to extract data compensated for motion out of the previous frame by adding the motion vector to the vertical/horizontal address outputted from the Raster Format writer (110), while from a motion compensator (FIG. 11)

compensating data is outputted from the memory for motion and the motion pixel selector (FIG. 10) is now explained in the following description.

FIG. 11 shows a structural diagram of a motion compensator which selects the needed 4 pixels, 32 bits among 8 pixels, 64 bits (each pixel, 8 bits) extracted from the even/odd memories. FIG. 10 shows a structural diagram of the motion pixel selector which generates the control signals needed in FIG. 11.

The exchanger (33) in FIG. 11 exchanges data outputted from the even and odd memories according to control signals (SS), or outputs without exchange. Specifically, in the case where the lefthand 4 pixels are outputted from the even memory, the data are outputted without exchange as "A" is read from the even memory and "A" from the odd memory. While in the case where the lefthand 4 pixels are outputted from the odd memory, the data are exchanged with each other as "A" is read from the odd memory and "V" from the even memory. Furthermore, in the case where the lefthand 4 pixels exist in the even memory is when 8 pixels inside a block are read, that it, when the even memory address is the same address as the odd memory, and in the case where the lefthand pixels exist in the odd memory is when 8 pixels are read throughout two blocks, that is, when the even memory address is different from the odd memory address. This is subject to motion vector (MVx2) as follows:

i) In the case where MAX(2)=0 (vertical address, horizontal address):

Even memory: (0,0)(0,1)(1,0)(1,1)(2,0)(2,1) ... (7,0)(7,1)

Odd memory: (0,0)(0,0)(1,0)(1,0)(2,0)(2,0) ... (7,0)(7,0)

ii) In the case where MAX(2)=1 (vertical address, horizontal address):

Even memory: (0, 1)(0,1)(1, 1)(1, 1)(2, 1)(2, 1) ... (7, 1)(7, 1)

Odd memory: (0, 0)(0, 1)(1, 0)(1, 1)(2, 0)(2, 1) ... (7, 0)(7, 1)

When motion vector MAX(2) is 0.1, the even/odd address iterates, every C/M, in a same case and a different case, while motion vector MAX(2) is 0 and 1, the same location of address is opposite to the different location. Hence, a signal (SAY) controlling the luminance signal is generated by exclusive OR-in luminance signal horizontal motion vector MAX(2) and C/8M through exclusive OR gate (29) in FIG. 10, and a signal (SS) of the exchanger (FIG. 11) is generated by selecting the control signal (SAY) during luminance signal intervals from multiplexed (31) after generating the chrominance signal control signal (SAY) by exclusive OR-in horizontal vectors MVCX(2) and C/8M, and selecting the control signal (SAC) during chrominance signal intervals.

The output of exchanger (33) in FIG. 11 is input to a shifter (34) shifted according to a control signal (MS). A control signal (MS) selects the least significant 2 bits MAX (1, 0) of the luminance signal horizontal motion vector and the least significant 2 bits MVCX(1, 0) of the chrominance signal horizontal motion vector especially selecting MAX(1, 0) during luminance signal intervals, while selecting MVCX (1, 0) during chrominance intervals. A shifter (34) in FIG. 11 shifts the inputs of 8 pixels according to a control signal (MS) composed of the least significant 2 bits of the motion vector to get the data of 4 pixels compensated for the motion vector.

As explained above, this invention is designed to have a memory which is an even/odd memory structure in a system compressing data by using the DPCM coding method for motion compensation frame intervals, to multiplex motion vectors processed in 4 steps parallel to one serial motion vector, to exchange the serial luminance motion vector into a chrominance signal motion vector. Therefore, this invention enables the structure of the circuit to be simple by using a motion compensation controller, allowing a motion compensation of HDTV to be easy by using a color difference motion vector then selecting motion pixel and compensating motion.

What is claimed is:

1. A method of compressing data in HDTV using DPCM coding between motion compensation frames, comprising the steps of:

multiplexing luminance signal vertical/horizontal motion vectors in a parallel four path process to form chrominance signal motion vectors;

multiplexing said chrominance signal motion vectors in a parallel four-path process to form color vertical/horizontal motion vectors;

multiplexing luminance signal vertical/horizontal motion vectors in a parallel four-path process into serial luminance motion vectors; and inputting said chrominance signal motion vectors and said luminance motion vectors into a memory for frame motion compensation.

2. Apparatus for compressing data in HDTV using DPCM coding between motion compensation frames, comprising:

means for multiplexing luminance signal vertical/horizontal motion vectors in a parallel four-path process to form chrominance signal motion vectors;

means for multiplexing said chrominance signal motion vectors in a parallel four-path process to form color vertical/horizontal motion vectors;

means for multiplexing luminance signal vertical/horizontal motion vectors in a parallel four-path process into serial luminance motion vectors;

a memory for frame motion compensation; and means for inputing the chrominance signal motion vectors and the luminance motion vectors into said memory.

3. The apparatus according to claim 2, further comprising an address controller including a raster format writer to control the means for inputting said chrominance signal motion vectors and the luminance motion vectors into said memory.

4. The apparatus according to claim 3, wherein said memory includes even/odd memories.

5. The apparatus according to claim 2, wherein each of said means for multiplexing includes an adder responsive to said raster format writer to generate even/odd memory addresses for said luminance motion vectors and said chrominance signal motion vectors.

6. The apparatus according to claim 2, further comprising an adder and additional data lines interconnecting said memory and said adder and wherein said chrominance horizontal motion vector is input to said adder through said additional data lines by additional addresses identical to the address of a chrominance horizontal motion vector.

7. The memory address controller according to claim 2, further comprising address buses output from said luminance vertical/horizontal motion vector generators and said chrominance vertical/horizontal motion vector generators are input to said multiplexers and said multiplexers select address buses by selection of a control signal of said luminance chrominance vertical/horizontal motion vector output from said Raster format writer and controlling the motion compensation of said memory by selecting the address of said luminance vertical/horizontal motion vector generators and said chrominance vertical/horizontal motion vector generators.

8. The device as defined in claim 2, further comprising a motion pixel selection circuit comprising a pair of Exclusive OR Gates to which are input common clock pulses and the luminance/chrominance horizontal motion vectors; a multiplexor to which is input the output of said pair of Exclusive OR Gates; another multiplexor to which is input the luminance/chrominance horizontal motion vectors for said luminance and said chrominance; said Raster format writer controlling said multiplexor and said another multiplexor to provide said luminance/chrominance horizontal motion vector to said motion selection circuit for outputing a selection control signal.

9. The device as defined in claim 2, further comprising a motion compensator comprising an exchanger which exchanges even/odd pixel data of said memory according to the output of said multiplexor and said motion pixel selection circuit; a shifter which selects pixel data to output through said exchanger according to the output of said another multiplexor and said motion pixel selection circuit.

* * * * *